(12) United States Patent
Tojigamori et al.

(10) Patent No.: US 8,980,476 B2
(45) Date of Patent: Mar. 17, 2015

(54) ACTIVE MATERIAL FOR BATTERY, BATTERY, AND METHOD FOR PRODUCTION OF ACTIVE MATERIAL FOR BATTERY

(75) Inventors: Takeshi Tojigamori, Susono (JP); Hideki Oki, Tokyo (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 344 days.

(21) Appl. No.: 13/570,964

(22) Filed: Aug. 9, 2012

(65) Prior Publication Data
US 2013/0052540 A1 Feb. 28, 2013

(30) Foreign Application Priority Data

Aug. 24, 2011 (JP) .................................. 2011-182879

(51) Int. Cl.
*H01M 4/48* (2010.01)
*H01M 10/0562* (2010.01)

(52) U.S. Cl.
CPC ............ *H01M 4/48* (2013.01); *H01M 10/0562* (2013.01); *Y02E 60/122* (2013.01)
USPC ...................................................... 429/231.5

(58) Field of Classification Search
USPC .................. 429/231.5, 218.1, 319; 252/182.1
See application file for complete search history.

(56) References Cited

U.S. PATENT DOCUMENTS

2012/0231350 A1 9/2012 Nishida et al.
2013/0022875 A1 1/2013 Tojigamori et al.

FOREIGN PATENT DOCUMENTS

JP A-2008-123787 5/2008
WO WO 2011/065388 A1 6/2011

(Continued)

OTHER PUBLICATIONS

Sylvio Indris et al., "Layered Oxysulfides as Insertion Hosts for Li-Ion Batteries," J. Am. Chem. Soc., vol. 128, p. 13354.

(Continued)

*Primary Examiner* — Kenneth Douyette
*Assistant Examiner* — James Lee
(74) *Attorney, Agent, or Firm* — Oliff PLC (57) ABSTRACT

An active material for a battery contains a $Y_2Ti_2O_5S_2$ crystalline phase, and has an $I_B/I_A$ value of 0.3 or smaller and an $I_C/I_A$ value of 0.15 or smaller, wherein $I_A$, $I_B$ and $I_C$ are the peak intensity of the $Y_2Ti_2O_5S_2$ crystalline phase at 2θ=34.5°, the peak intensity of a $Y_2T_2O_7$ crystalline phase at 2θ35.6°, and the peak intensity of $TiS_2$ at 2θ=34.1°, respectively, that are measured by X-ray diffraction using CuKα radiation. The active material is synthesized by preparing a raw material composition containing $TiS_2$, $TiO_2$ and $Y_2O_3$ and having a molar ratio of $TiS_2$ to $Y_2O_3$ of higher than 1 or containing $TiS_2$, $TiO_2$ and $Y_2O_3$ and having a molar ratio of $TiO_2$ to $Y_2O_3$ of lower than 1, and heating the raw material composition. A positive or negative-electrode active material layer included in the battery may be contain the active material.

6 Claims, 5 Drawing Sheets

(56) References Cited

FOREIGN PATENT DOCUMENTS

| WO | WO 2011/117992 A1 | 9/2011 |
| WO | WO 2011/118302 A1 | 9/2011 |

OTHER PUBLICATIONS

Hyett et al., "Electronically Driven Structural Distortions in Lithium Intercalates of the n=2 Ruddlesden-Popper-Type Host $Y_2Ti_2O_5S_2$: Synthesis, Structure, and Properties of $Li_xY_2Ti_2O_5S_2$ ($0<x<2$)," J. Am. Chem. Soc., vol. 126, No. 7, pp. 1980-1991, 2004.

ACTIVE MATERIAL FOR BATTERY, BATTERY, AND METHOD FOR PRODUCTION OF ACTIVE MATERIAL FOR BATTERY

INCORPORATION BY REFERENCE

The disclosure of Japanese Patent Application No. 2011-182879 filed on Aug. 24, 2011 including the specification, drawings and abstract is incorporated herein by reference in its entirety.

BACKGROUND OF THE INVENTION

1. Field of the Invention

The present invention relates to an active material for a battery that is useful as a negative-electrode active material of a lithium battery, for example, a battery that contains the active material for a battery, and a method for the production of the active material for a battery.

2. Description of Related Art

Lithium batteries have been put to practical use in many fields, such as information-related devices and communication devices, because of their high electromotive force and high energy density. In addition, rapid development of electrical vehicles and hybrid vehicles is also desired in the field of automobiles from the perspective of environmental protection and resource consumption, and lithium batteries are considered as power sources for such vehicles. A lithium battery usually has a positive-electrode active material layer that contains a positive-electrode active material, a negative-electrode active material layer that contains a negative-electrode active material, and an electrolyte layer that is formed between the positive-electrode active material layer and the negative-electrode active material layer.

A carbon material (such as graphite) is used as a negative-electrode active material of lithium batteries. On the other hand, an active material with higher thermal stability is desired to improve safety. Japanese Patent Application Publication No. 2008-123787 (JP 2008-123787 A) discloses a non-aqueous electrolyte battery in which lithium titanate (LTO) is used as a negative-electrode active material. Because LTO is an oxide, it has high thermal stability and is advantageous in terms of safety.

However, because LTO has an Li intercalation-deintercalation potential (oxidation-reduction potential), as measured with respect to metal Li (as measured versus metal Li), of about 1.5 V, which is higher than that of a carbon material (about 0.3 V), the resulting battery has a lower battery voltage. The battery voltage can be defined as the difference between the Li intercalation-deintercalation potential of the positive-electrode active material and the Li intercalation-deintercalation potential of the negative-electrode active material, for example. Thus, as the Li intercalation-deintercalation potential of the negative-electrode active material is higher, the resulting battery has a lower battery voltage as long as the same positive-electrode active material is used.

In "Electronically Driven Structural Distortions in Lithium Intercalates of the n=2 Ruddlesden-Popper-Type Host $Y_2Ti_2O_5S_2$: Synthesis, Structure, and Properties of $Li_xY_2Ti_2O_5S_2$ (0<x<2)," Geoffrey Hyett et al., Journal of the American Chemical Society, 126, 1980-1991 (2004), evaluation of physical properties of $Li_xY_2Ti_2O_5S_2$ is disclosed. In this literature, however, the physical properties of $Li_xY_2Ti_2O_5S_2$ are simply evaluated and no evaluation was conducted on battery properties. In addition, in "Electronically Driven Structural Distortions in Lithium Intercalates of the n=2 Ruddlesden-Popper-Type Host $Y_2Ti_2O_5S_2$: Synthesis, Structure, and Properties of $Li_xY_2Ti_2O_5S_2$ (0<x<2)," Geoffrey Hyett et al., Journal of the American Chemical Society, 126, 1980-1991 (2004), Li is forcibly introduced into $Y_2Ti_2O_5S_2$ to synthesize $Li_xY_2Ti_2O_5S_2$. However, there is no statement that Li can be deintercalated, and there is no statement that suggests that $Li_xY_2Ti_2O_5S_2$ can serve as an active material accordingly.

To obtain a high performance battery, an active material for a battery with high thermal stability and low potential is necessary. Based on previous studies, the present inventors have found that an active material for a battery that contains a $Y_2Ti_2O_5S_2$ crystalline phase can be one of active materials that satisfy the above requirements (PCT/JP2011/053502).

SUMMARY OF THE INVENTION $Y_2Ti_2O_5S_2$ can be obtained when equimolar amounts of $TiS_2$, $TiO_2$ and $Y_2O_3$ are used from the perspective of composition. In fact, however, when a raw material composition which contains equimolar amounts of $TiS_2$, $TiO_2$ and $Y_2O_3$ is used, a small amount of impurity is formed.

The present invention provides an active material for a battery which is composed of a substantially single $Y_2Ti_2O_5S_2$ crystalline phase with a low impurity content, a battery that contains the active material for a battery, and a method for the production of the active material for a battery.

The present inventors found, as a result of intensive studies, that a substantially single $Y_2Ti_2O_5S_2$ crystalline phase with a low impurity content can be achieved by adjusting the proportion of at least one of $TiS_2$ and $TiO_2$ in a raw material composition and have made the present invention.

A first aspect of the present invention relates to an active material for a battery. The active material contains a $Y_2Ti_2O_5S_2$ crystalline phase, and has an $I_B/I_A$ value of 0.3 or smaller and an $I_C/I_A$ value of 0.15 or smaller, wherein $I_A$, $I_B$ and $I_C$ are the peak intensity of the $Y_2Ti_2O_5S_2$ crystalline phase at 2θ=34.5°, the peak intensity of a $Y_2Ti_2O_7$ crystalline phase at 2θ=35.6°, and the peak intensity of $TiS_2$ at 2θ=34.1°, respectively, that are measured by X-ray diffraction using CuKα radiation.

According to the first aspect of the present invention, the fact that the $I_B/I_A$ and $I_C/I_A$ values are smaller than specific values assures that the active material for a battery is composed of a substantially single $Y_2Ti_2O_5S_2$ crystalline phase with a low impurity content.

A second aspect of the present invention relates to a battery. The battery includes a positive-electrode active material layer that contains a positive-electrode active material, a negative-electrode active material layer that contains a negative-electrode active material, and an electrolyte layer that is formed between the positive-electrode active material layer and the negative-electrode active material layer. The positive-electrode active material layer or the negative-electrode active material layer contains the active material as described above.

According to the second aspect of the present invention, the use of the active material for a battery, which has high thermal stability, assures that the battery is a safe and secure battery.

In the above aspect, the negative-electrode active material layer may contain the active material. This is because a battery with a high battery voltage can be achieved.

In the above aspect, the active material may be in contact with a solid electrolyte material that is represented by $Li_{1+x}Al_xGe_{2-x}(PO_4)_3$, wherein x is equal to or greater than 0, and equal to or less than 2. The positive-electrode active material layer or the negative-electrode active material layer which contains the active material may be constituted of a sintered body. This is because the formation of a different phase at the interface between the active material for a battery and the LAGP during calcination can be prevented.

In the above aspect, the positive-electrode active material layer may be composed of an olivine-type positive-electrode active material. The positive-electrode active material layer, the electrolyte layer and the negative-electrode active material layer may contain a solid electrolyte material represented by $Li_{1+x}Al_xGe_{2-x}(PO_4)_3$, wherein x is equal to or greater than 0, and equal to or less than 2. The positive-electrode active material layer, the electrolyte layer and the negative-electrode active material layer may be integrated in a sintered body. This is because the formation of a different phase at the interface between the active material for a battery (negative-electrode active material) and the LAGP and at the interface between the positive-electrode active material and the LAGP during calcination can be prevented. In addition, when all of the positive-electrode active material layer, the electrolyte layer and the negative-electrode active material layer contain LAGP, a sintered body with low interface resistance can be achieved.

A third aspect of the present invention relates to a battery. The battery includes a positive-electrode active material layer that contains a positive-electrode active material, a negative-electrode active material layer that contains a negative-electrode active material, and an electrolyte layer that is formed between the positive-electrode active material layer and the negative-electrode active material layer. The positive-electrode active material layer or the negative-electrode active material layer contains an active material that has a $Y_2Ti_2O_5S_2$ crystalline phase. The active material is in contact with a solid electrolyte material that is represented by $Li_{1+x}Al_xGe_{2-x}(PO_4)_3$, wherein x is equal to or greater than 0, and equal to or less than 2. The positive-electrode active material layer or the negative-electrode active material layer which contains the active material is constituted of a sintered body.

According to the third aspect of the present invention, the use of the active material for a battery, which has high thermal stability, assures that the battery is a safe and secure battery. In addition, in the present invention, the formation of a different phase at the interface between the active material for a battery and the LAGP during calcination can be prevented.

In the above aspect, the active material may be composed primarily of the $Y_2Ti_2O_5S_2$ crystalline phase. This is because the active material for a battery has a lower potential.

In the above aspect, the negative-electrode active material layer may contain the active material. This is because a battery with a high battery voltage can be achieved.

In the above aspect, the positive-electrode active material layer may be composed of an olivine-type positive-electrode active material. All of the positive-electrode active material layer, the electrolyte layer and the negative-electrode active material layer may contain a solid electrolyte material represented by $Li_{1+x}Al_xGe_{2-x}(PO_4)_3$, wherein x is equal to or greater than 0, and equal to or less than 2. The positive-electrode active material layer, the electrolyte layer and the negative-electrode active material layer may be integrated in a sintered body. This is because the formation of a different phase at the interface between the negative-electrode active material and the LAGP and at the interface between the positive-electrode active material and the LAGP during calcination can be prevented. In addition, when all of the positive-electrode active material layer, the electrolyte layer and the negative-electrode active material layer contain LAGP, a sintered body with low interface resistance can be achieved.

A fourth aspect of the present invention relates to a method for the production of an active material for a battery. The production method includes the steps of preparing a raw material composition which contains $TiS_2$, $TiO_2$ and $Y_2O_3$ and has a molar ratio of $TiS_2$ to $Y_2O_3$ of higher than 1 or which contains $TiS_2$, $TiO_2$ and $Y_2O_3$ and has a molar ratio of $TiO_2$ to $Y_2O_3$ of lower than 1 so that the active material which has an $I_B/I_A$ value of 0.3 or smaller and an $I_C/I_A$ value of 0.15 or smaller is formed, wherein $I_A$, $I_B$ and $I_C$ are the peak intensity of a $Y_2Ti_2O_5S_2$ crystalline phase at $2\theta=34.5°$, the peak intensity of a $Y_2Ti_2O_7$ crystalline phase at $2\theta=35.6°$, and the peak intensity of $TiS_2$ at $2\theta=34.1°$, respectively, that are measured by X-ray diffraction using CuKα radiation, and heating the raw material composition to synthesize an active material, having the $I_B/I_A$ value and the $I_C/I_A$ value, that is composed of the $Y_2Ti_2O_5S_2$ crystalline phase.

According to the fourth aspect of the present invention, an active material for a battery which is composed of a substantially single $Y_2Ti_2O_5S_2$ crystalline phase with a low impurity content can be obtained by increasing the proportion of at least one of $TiS_2$ and $TiO_2$.

In the above aspect, the molar ratio of $TiS_2$ to $Y_2O_3$ may be higher than 1 and lower than 1.15, and the molar ratio of $TiO_2$ to $Y_2O_3$ may be higher than 0.85 and lower than 1.

The present invention allows for the provision of an active material for a battery which is composed of a substantially single $Y_2Ti_2O_5S_2$ crystalline phase with a low impurity content.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Description is hereinafter made of an active material for a battery, a method for the production of an active material for a battery and a battery according to an embodiment of the present invention in detail.

A. Active Material for Battery

An active material for a battery of an embodiment is first described. The active material for a battery of the embodiment is composed of a $Y_2Ti_2O_5S_2$ crystalline phase, and has an $I_B/I_A$ value of 0.3 or smaller and an $I_C/I_A$ value of 0.15 or smaller, wherein $I_A$, $I_B$ and $I_C$ are the peak intensity of the $Y_2Ti_2O_5S_2$ crystalline phase at $2\theta=34.5°$, the peak intensity of a $Y_2Ti_2O_7$ crystalline phase at $2\theta=35.6°$, and the peak intensity of $TiS_2$ at $2\theta=34.1°$, respectively, that are measured by X-ray diffraction using CuKα radiation.

These peak positions may be slightly shifted depending on the state of crystal lattice. Thus, the above peak positions include a margin of error of ±0.2°.

According to the embodiment of the present invention, the fact that the $I_B/I_A$ and $I_C/I_A$ values are smaller than or equal to specific values assures that the active material for a battery is composed of a substantially single $Y_2Ti_2O_5S_2$ crystalline phase with a low impurity content. In addition, according to the embodiment of the present invention, the fact that the active material for a battery has a $Y_2Ti_2O_5S_2$ crystalline phase assures that it has a low potential. Thus, the active material for a battery of the embodiment is useful as a negative-electrode active material, for example. In addition, the active material for a battery of the embodiment has the advantage of having higher thermal stability than conventional carbon materials because it contains an O element and exhibits behavior of an oxide.

The active material for a battery of the embodiment is composed of a $Y_2Ti_2O_5S_2$ crystalline phase. The presence of the $Y_2Ti_2O_5S_2$ crystalline phase can be determined by X-ray diffraction (XRD), for example. The $Y_2Ti_2O_5S_2$ crystalline phase is considered to correspond to a crystalline phase of a defective Ruddlesden-Popper structure. In general, a Ruddlesden-Popper structure has a composition that is represented by a general formula $A_{n+1}B_nC_{3n+1}$ (wherein n is an integer), and has a layered structure in which a perovskite structure and a halite structure are alternated. When n is assumed to be 2, the above general formula can be represented as $A_3B_2C_7$. When the formula $A_3B_2C_7$ and the formula $Y_2Ti_2O_5S_2$ in the embodiment of the present invention are compared, Y lies in the A site, Ti lies in the B site, and O and S lie in the C site. In addition, when three atoms of Y lie in the A site, the structure corresponds to a perfect Ruddlesden-Popper structure. However, in the embodiment of the present invention, only two atoms of Y lie in the A site. It is, therefore, believed that because the A site has a defect and metal ions (such as Li ions) are intercalated into and deintercalated from the defective sites, the active material for a battery prominently exhibits a function as an active material. In addition, the reaction between the $Y_2Ti_2O_5S_2$ crystalline phase and metal ions (such as Li ions) is believed to be as follows, and the $Y_2Ti_2O_5S_2$ crystalline phase is believed to function as what is called an intercalation-deintercalation-type active material;

$$Y_2Ti_2O_5S_2 + xLi^+ + xe^- \leftrightarrow Li_xY_2Ti_2O_5S_2$$

In the embodiment of the present invention, the $I_B/I_A$ value is usually 0.3 or smaller, preferably 0.1 or smaller, more preferably 0.05 or smaller. This is because the $Y_2Ti_2O_7$ crystalline phase as an impurity may cause a decrease in battery capacity when the $I_B/I_A$ value is too large. On the other hand, in the embodiment of the present invention, the $I_C/I_A$ value is usually 0.15 or smaller, preferably 0.12 or smaller. This is because $TiS_2$ as an impurity may react with water to form hydrogen sulfide when the $I_C/I_A$ value is too large.

While the active material for a battery of the embodiment may be used as a positive-electrode active material or a negative-electrode active material, the use of it as the latter is preferred. This is because the use of the active material for a battery of the embodiment as a negative-electrode active material of a lithium battery, for example, leads to an increase in battery voltage compared to a conventional case where LTO is used as a negative-electrode active material.

In addition, the active material for a battery of the embodiment has the advantage of having high electron conductivity because it is composed of a substantially single $Y_2Ti_2O_5S_2$ crystalline phase. When the active material itself has high electron conductivity, the use of conductive material can be reduced and the use of active material can be increased accordingly. This provides the advantage of allowing an increase in the capacity of the battery.

The active material for a battery of the embodiment is preferably in the form of particles. In addition, the active material for a battery preferably has an average particle size in a range of 1 nm to 100 μm, for example, preferably in a range of 10 nm to 30 μm.

The active material for a battery of the embodiment, which can intercalate and deintercalate a metal (metal ions), can be used as an active material of various types of batteries. Examples of the types of the batteries include lithium battery, sodium battery, magnesium battery and calcium battery. Above all, lithium battery and sodium battery are preferred, and lithium battery is especially preferred. In addition, while the active material for a battery of the embodiment may be used either as an active material of a primary battery or as an active material of a secondary battery, the use of it as the latter is preferred. This is because the active material for a battery of the embodiment is useful as an active material of a battery for a vehicle, for example, because it can be repeatedly charged and discharged.

B. Method for Production of Active Material for Battery

A method for the production of an active material for a battery of the embodiment is next described. The method for the production of an active material for a battery of the embodiment includes a calcination step of heating a raw material composition which contains $TiS_2$, $TiO_2$ and $Y_2O_3$ to synthesize an active material for a battery which is composed of a $Y_2Ti_2O_5S_2$ crystalline phase, and is characterized by at least one of adjusting the molar ratio of $TiS_2$ to $Y_2O_3$ in the raw material composition to higher than 1 and adjusting the molar ratio of $TiO_2$ to $Y_2O_3$ in the raw material composition to lower than 1 so that the active material for a battery will have an $I_B/I_A$ value of 0.3 or smaller and an $I_C/I_A$ value of 0.15 or smaller, wherein $I_A$, $I_B$ and $I_C$ are the peak intensity of the $Y_2Ti_2O_5S_2$ crystalline phase at $2\theta=34.5°$, the peak intensity of a $Y_2Ti_2O_7$ crystalline phase at $2\theta=35.6°$, and the peak intensity of $TiS_2$ at $2\theta=34.1°$, respectively, that are measured by X-ray diffraction using CuKα radiation.

Figure 1:
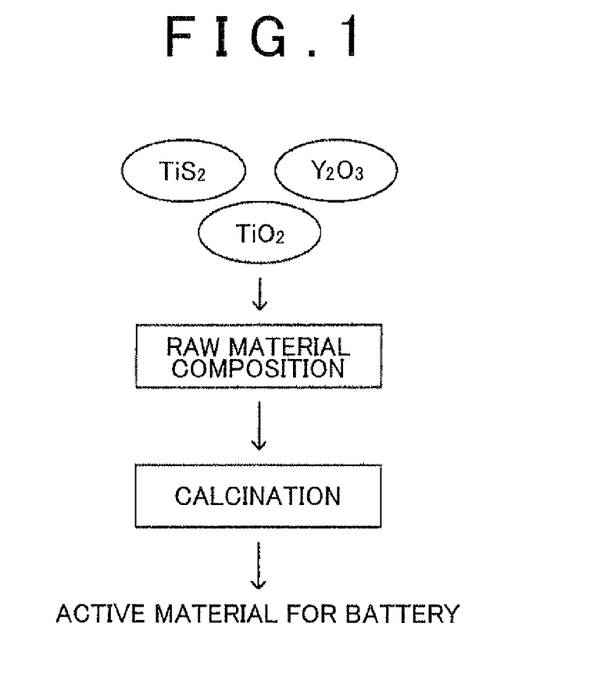
FIG. 1 is a flowchart that shows one example of a method for the production of an active material for a battery according to an embodiment of the present invention.

FIG. 1 is a flowchart that shows one example of a method for the production of an active material for a battery according to the embodiment. First, $TiS_2$, $TiO_2$ and $Y_2O_3$ are mixed to prepare a raw material composition as shown in FIG. 1. Then, the raw material composition is calcined in a quartz tube in a vacuum. As a result, a solid phase reaction occurs, and an active material for a battery which has a $Y_2Ti_2O_5S_2$ crystalline phase can be obtained. In the embodiment of the present invention, the proportion of at least one of $TiS_2$ and $TiO_2$ is adjusted so that the $I_B/I_A$ value and the $I_C/I_A$ value can be specific values.

According to the embodiment of the present invention, an active material for a battery which is composed of a substantially single $Y_2Ti_2O_5S_2$ crystalline phase with a low impurity content can be obtained by increasing the proportion of at least one of $TiS_2$ and $TiO_2$. As described above, $Y_2Ti_2O_5S_2$ can be obtained when equimolar amounts of $TiS_2$, $TiO_2$ and $Y_2O_3$ are used from the perspective of composition. In fact, however, when a raw material composition which contains equimolar amounts of $TiS_2$, $TiO_2$ and $Y_2O_3$ is used, a small amount of impurity ($Y_2Ti_2O_7$ crystalline phase) is formed. The mechanism by which a $Y_2Ti_2O_2$ crystalline phase is formed is assumed to be as follows. It is believed that sulfur deficiency and oxygen excess occur in the composition because $TiS_2$ that is contained in the raw material composition reacts with water to form hydrogen sulfide ($H_2S$) and titanium oxide ($TiO_2$). In addition, the oxygen excess leads to the formation of a $Y_2Ti_2O_7$ crystalline phase rather than a $Y_2Ti_2O_5S_2$ crystalline phase. In contrast, in the embodiment of the present invention, the proportion of $TiS_2$, for example, is increased, instead of using a composition which contains equimolar amounts of $TiS_2$, $TiO_2$ and $Y_2O_3$, to cause an excess amount of sulfur to be present so that a $Y_2Ti_2O_7$ crystalline phase cannot be formed even when sulfur deficiency occurs. Alternatively, the formation of a $Y_2Ti_2O_7$ crystalline phase may be prevented by reducing the proportion of $TiO_2$ to reduce the proportion of oxygen preliminarily. Especially, in the embodiment of the present invention, it is preferred to increase the proportion of $TiS_2$ and decrease the proportion of $TiO_2$. This is because excess or deficiency of Ti is less likely to occur.

The calcination step in the embodiment is a step of heating a raw material composition which contains $TiS_2$, $TiO_2$ and $Y_2O_3$ to synthesize an active material for a battery which is composed of a $Y_2Ti_2O_5S_2$ crystalline phase.

The proportions of $TiS_2$ and $TiO_2$ in the raw material composition are adjusted in such a manner that the $I_B/I_A$ value and the $I_C/I_A$ value can be specific values. The $I_B/I_A$ value and the $I_C/I_A$ value have been already described in "A. Active material for battery" and therefore their description is omitted here.

When the proportion of $TiS_2$ is increased, for example, the molar ratio of $TiS_2$ to $Y_2O_3$ is usually higher than 1, preferably 1.02 or higher, more preferably 1.05 or higher. Similarly, the molar ratio of $TiS_2$ to $Y_2O_3$ is preferably lower than than 1.15, more preferably 1.13 or lower, much more preferably 1.1 or lower. On the other hand, when the proportion of $TiO_2$ is decreased, for example, the molar ratio of $TiO_2$ to $Y_2O_3$ is usually lower than 1, preferably 0.98 or lower, more preferably 0.95 or lower. Similarly, the molar ratio of $TiO_2$ to $Y_2O_3$ is preferably higher than 0.85, more preferably 0.87 or higher, much more preferably 0.9 or higher.

When the proportion of $Y_2O_3$ in the raw material composition is 1 part by mole, the proportion of the total of $TiS_2$ and $TiO_2$ is preferably in a range of 1.9 parts by mole to 2.1 parts by mole, for example, more preferably in a range of 1.95 parts by mole to 2.05 parts by mole. This is because excess or deficiency of Ti is less likely to occur when the proportion of the total of $TiS_2$ and $TiO_2$ is in the above range.

The calcination temperature in the embodiment is not specifically limited as long as a desired active material for a battery can be obtained. For example, the calcination temperature is in a range of 800° C. to 1,400° C., for example, preferably in a range of 1,000° C. to 1,200° C. This is because no solid phase reaction may occur when the calcination temperature is too low and an undesired crystalline phase may be formed when the calcination temperature is too high. The calcination time, which is not specifically limited, is preferably in a range of 24 hours to 384 hours, more preferably in a range of 48 hours to 192 hours. The calcination is preferably carried out in a vacuum from the perspective of prevention of a side reaction.

C. Battery

A battery of the embodiment is next described. The battery of the embodiment of the present invention can be roughly divided into first and second embodiments. The first and second embodiments of the battery are described separately.

1. First Embodiment

A battery of a first embodiment is a battery which has a positive-electrode active material layer that contains a positive-electrode active material, a negative-electrode active material layer that contains a negative-electrode active material, and an electrolyte layer that is formed between the positive-electrode active material layer and the negative-electrode active material layer. The positive-electrode active material layer or the negative-electrode active material layer contains the active material for a battery as described above.

Figure 2:
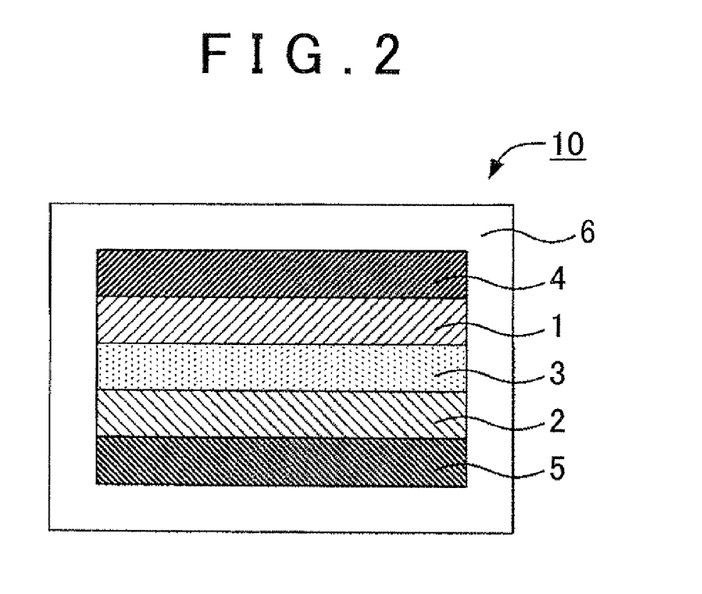
FIG. 2 is a schematic cross-sectional view of one example of a battery according to an embodiment of the present invention.

FIG. 2 is a schematic cross-sectional view of one example of the battery of the first embodiment. A battery 10 that is shown in FIG. 2 has a positive-electrode active material layer 1, a negative-electrode active material layer 2, an electrolyte layer 3 that is formed between the positive-electrode active material layer 1 and the negative-electrode active material layer 2, a positive electrode current collector 4 that collects current from the positive-electrode active material layer 1, a negative electrode current collector 5 that collects current from the negative-electrode active material layer 2, and a battery case 6 that houses the above constituent elements. In the battery of the first embodiment, the positive-electrode active material layer 1 or the negative-electrode active material layer 2 contains the active material for a battery as described in "A. Active material for battery."

According to the first embodiment, the use of the active material for a battery, which has high thermal stability, assures that the battery is a safe and secure battery. Especially, when the negative-electrode active material layer contains the active material for a battery, a battery with a high battery voltage can be achieved. Each constituent element of the battery of the first embodiment is described below.

(1) Negative-Electrode Active Material Layer

The negative-electrode active material layer in the first embodiment is first described. The negative-electrode active material layer in the first embodiment is a layer that contains at least a negative-electrode active material. The negative-electrode active material layer may contain at least one of a conductive material, a binder and a solid electrolyte material in addition to the negative-electrode active material. Especially, when the battery of the first embodiment is a solid battery that has a solid electrolyte layer, the negative-electrode active material layer preferably contains a solid electrolyte material. This is because a solid electrolyte layer is less likely to penetrate into the negative-electrode active material layer than a liquid electrolyte layer (electrolytic solution) and may cause a decrease in ion conductivity in the negative-electrode active material layer. The ion conductivity of the negative-electrode active material layer can be easily improved by the addition of a solid electrolyte material.

In the first embodiment, the negative-electrode active material is preferably the active material for a battery as described in "A. Active material for battery." This is because the battery voltage can be increased compared to a conventional battery in which LTO is used as a negative-electrode active material when the battery of the first embodiment is a lithium battery, for example. In the first embodiment, the active material for a battery as described above may be used as a positive-electrode active material with a conventional active material used as a negative-electrode active material. In this case, an active material with a lower potential than the active material for a battery as described above must be used as the negative-electrode active material. In addition, because the active material for a battery as described above is free of a metal element (such as an Li element) as a conductive ion source, the negative-electrode active material preferably contains a metal element as a conductive ion source. Especially, when the battery of the first embodiment is a lithium battery and when the active material for a battery as described above is contained as a positive-electrode active material, an Li-containing active material, such as metal Li or an Li alloy, is preferably used as a negative-electrode active material.

The material of the conductive material is not specifically limited as long as it has desired electron conductivity. An example is carbon materials. Specific examples of the carbon materials include acetylene black, Ketjen black, carbon black, coke, carbon fibers and graphite. The material of the binder is not specifically limited as long as it is chemically and electrically stable. Examples of the binder include fluorine binders such as polyvinylidene fluoride (PVDF) and polytetrafluoroethylene (PTFE), and rubber-based binders such as styrene-butadiene rubber. The solid electrolyte material is not specifically limited as long as it has desired ion conductivity. Examples include oxide solid electrolyte materials and sulfide solid electrolyte materials. The solid electrolyte material is described later in detail in "(3) Electrolyte layer."

The content of the negative-electrode active material in the negative-electrode active material layer is preferably as high as possible from the perspective of capacity. For example, the content of the negative-electrode active material is in a range of 60% by weight to 99% by weight, preferably in a range of 70% by weight to 95% by weight. The content of the conductive material is preferably as low as possible as long as desired electron conductivity can be achieved. For example, the content of the conductive material is preferably in a range of 1% by weight to 30% by weight. The content of the binder is preferably as low as possible as long as the negative-electrode active material and so on can be fixed stably. For example, the content of the binder is preferably in a range of 1% by weight to 30% by weight. The content of the solid electrolyte material is preferably as low as possible as long as desired ion conductivity can be achieved. For example, the content of the solid electrolyte material is preferably in a range of 1% by weight to 40% by weight.

The negative-electrode active material layer preferably has a thickness in a range of 0.1 μm to 1,000 μm, for example, although it significantly depends on the configuration of the battery.

(2) Positive-Electrode Active Material Layer

The positive-electrode active material layer in the first embodiment is next described. The positive-electrode active material layer in the first embodiment is a layer that contains at least a positive-electrode active material. The positive-electrode active material layer may contain at least one of a conductive material, a binder and a solid electrolyte material in addition to the positive-electrode active material. Especially, when the battery of the first embodiment is a solid battery that has a solid electrolyte layer, the positive-electrode active material layer preferably contains a solid electrolyte material. This is because a solid electrolyte layer is less likely to penetrate into the positive-electrode active material layer than a liquid electrolyte layer (electrolytic solution) and may cause a decrease in ion conductivity in the positive-electrode active material layer. The ion conductivity of the positive-electrode active material layer can be easily improved by the addition of a solid electrolyte material.

In the first embodiment, the positive-electrode active material preferably is an active material which has a higher potential than the active material for a battery as described above. In other words, the active material for a battery as described above is preferably used not as a positive-electrode active material but as a negative-electrode active material. This is because the battery voltage can be increased compared to a conventional battery in which LTO is used as a negative-electrode active material when the battery of the first embodiment is a lithium battery, for example.

When the active material for a battery as described above is used as a negative-electrode active material, a commonly-used active material may be used as a positive-electrode active material. Examples of the positive-electrode active material that can be used when the battery of the first embodiment is a lithium battery include layered positive-electrode active materials such as $LiCoO_2$, $LiNiO_2$, $LiCo_{1/3}Ni_{1/3}Mn_{1/3}O_2$, $LiVO_2$ and $LiCrO_2$, and spinel-type positive-electrode active materials such as $LiMn_2O_4$, $Li(Ni_{0.25}Mn_{0.75})_2O_4$, $LiCoMnO_4$ and $Li_2NiMn_3O_8$, and olivine-type positive-electrode active materials such as $LiCoPO_4$, $LiMnPO_4$ and $LiFePO_4$.

The positive-electrode active material in the first embodiment is preferably an active material which has an Li intercalation-deintercalation potential, as measured with respect to metal Li, of 4.5 V or higher, more preferably in a range of 4.6 V to 4.8 V. This is because a battery with a battery voltage 3.4 V to 3.7 V can be obtained easily when such a positive-electrode active material and the active material for a battery (negative-electrode active material) are used in combination. The reason why this battery voltage is preferred is described later.

The positive-electrode active material in the first embodiment is preferably an active material which contains at least Li, Mn and O elements (Mn-containing active material). In this case, the positive-electrode active material preferably further contains at least one element that is selected from the group which consists of Ni, Cr, Fe, Cu and Co elements, more preferably further contains at least one element that is selected from the group which consists of Ni, Cr, Fe and Cu elements, especially preferably further contains an Ni element. The positive-electrode active material is preferably a spinel-type active material. This is because a positive-electrode active material which has a high Li intercalation-deintercalation potential, as measured with respect to metal Li, can be obtained. Examples of such a positive-electrode active material include $LiMn_2O_4$ (4.0 V), $Li(Ni_{0.25}Mn_{0.75})_2O_4$ (4.7 V), $LiCoMnO_4$ (5.0 V), $Li_2FeMn_3O_8$ (4.9 V), $Li_2CuMn_3O_8$ (4.9 V) and $Li_2CrMn_3O_8$ (4.8 V). The above potentials are their Li intercalation-deintercalation potential, as measured versus metal Li.

In the first embodiment, the difference between the Li intercalation-deintercalation potential, as measured with respect to metal Li, of the positive-electrode active material and the Li intercalation-deintercalation potential, as measured with respect to metal Li (as measured versus metal Li), of the negative-electrode active material is preferably in a range of 3.4 V to 3.7 V, more preferably in a range of 3.5 V to 3.7 V. This is because devices that are currently used widely (devices that are equipped with a battery with a battery voltage of 3.6 V) can use the battery of the first embodiment without any change in design.

The battery voltage can be defined using the difference in Li intercalation-deintercalation potential between the positive-electrode active material and the negative-electrode active material. Conventional $LiCoO_2$ (positive-electrode active material) has an Li intercalation-deintercalation potential, as measured with respect to metal Li (as measured versus metal Li), of about 3.9 V and a conventional carbon material (negative-electrode active material) has an Li intercalation-deintercalation potential, as measured with respect to metal Li (as measured versus metal Li), of about 0.3 V. Thus, a conventional lithium battery has a battery voltage of about 3.6 V, which is equal to the difference between their Li intercalation-deintercalation potentials. Because $LiCoO_2$ is widely used in ordinary lithium batteries, many portable devices, such as cellular phones, games, laptop computers, are designed to use a battery at a voltage around 3.6 V. On the other hand, Co, which is contained in $LiCoO_2$, is a rare metal and it is necessary to consider a switch to an Mn-based or Mn-containing active material in order to reduce the use of Co.

However, when an Mn-containing active material is used in place of $LiCoO_2$, which is currently used widely, the devices cannot use the battery without changes in design because the battery voltage does not reach around 3.6 V even when a conventional carbon material or LTO is used as a negative-electrode active material. In contrast, when the active material for a battery as described above (active material with an Li intercalation-deintercalation potential=1.1 V to 1.2 V) is used as a negative-electrode active material and an Mn-containing active material as described above (an active material with an Li intercalation-deintercalation potential=4.6 V to 4.8 V, for example) is used as a positive-electrode active material, a battery with a battery voltage of 3.4 V to 3.7 V can be obtained easily. This provides the advantage that there is no need to change the design of conventional devices. In addition, when an Mn-containing active material is used as a positive-electrode active material, the use of the rare metal Co can be reduced.

The positive-electrode active material is preferably in the form of particles. In addition, the positive-electrode active material has an average particle size in a range of 1 nm to 100 µm, for example, preferably in a range of 10 nm to 30 µm. The content of the positive-electrode active material in the positive-electrode active material layer is preferably as high as possible from the perspective of capacity. For example, the content of the positive-electrode active material is in a range of 60% by weight to 99% by weight, preferably in a range of 70% by weight to 95% by weight. The types and contents of the conductive material, binder and solid electrolyte material that can be used in the positive-electrode active material layer are the same as those of the conductive material, binder and solid electrolyte material for the negative-electrode active material layer as described above, and therefore their description is omitted here. The positive-electrode active material layer preferably has a thickness in a range of 0.1 µm to 1,000 µm, for example, although it significantly depends on the configuration of the battery.

(3) Electrolyte Layer

The electrolyte layer in the first embodiment is next described. The electrolyte layer in the first embodiment is a layer that is formed between the positive-electrode active material layer and the negative-electrode active material layer. The electrolyte layer contains an electrolyte that allows ion conduction between the positive-electrode active material and the negative-electrode active material. Examples of the form of the electrolyte layer include, but are not limited to, solid electrolyte layer, liquid electrolyte layer and gel electrolyte layer.

A solid electrolyte layer is a layer that is composed of a solid electrolyte material. Examples of the solid electrolyte material include oxide solid electrolyte materials and sulfide solid electrolyte materials. Examples of oxide solid electrolyte materials which have Li ion conductivity include compounds that have a NASICON-type structure. An example of the compound that has a NASICON-type structure is a compound which is represented by a general formula $Li_{1+x}Al_xGe_{2-x}(PO_4)_3$ ($0 \leq x \leq 2$) (which is sometimes referred to as "LAGP"). In particular, the oxide solid electrolyte material is preferably $Li_{1.5}Al_{0.5}Ge_{1.5}(PO_4)_3$. Another example of the compound that has a NASICON-type structure is a compound which is represented by a general formula $Li_{1+x}Al_xTi_{2-x}(PO_4)_3$ ($0 \leq x \leq 2$) (which is sometimes referred to as "LATP"). In particular, the oxide solid electrolyte material is preferably $Li_{1.5}Al_{0.5}Ti_{1.5}(PO_4)_3$. Other examples of the oxide solid electrolyte material include LiLaTiO (such as $Li_{0.34}La_{0.51}TiO_3$), LiPON (such as $Li_{2.9}PO_{3.3}N_{0.46}$) and LiLaZrO (such as $Li_7La_3Zr_2O_{12}$).

Examples of sulfide solid electrolyte materials which have Li ion conductivity include materials that are composed of Li, S and a third component A. An example of the third component A is at least one that is selected from the group which consists of P, Ge, B, Si, I, Al, Ga and As. Above all, the sulfide solid electrolyte material in the first embodiment is preferably a compound that uses $Li_2S$ and a sulfide MS other than $Li_2S$. Specific examples include an $Li_2S$—$P_2S_5$ compound, an $Li_2S$—$SiS_2$ compound and an $Li_2S$—$GeS_2$ compound. Above all, an $Li_2S$—$P_2S_5$ compound is preferred because of its high Li ion conductivity. In addition, when the molar ratio between $Li_2S$ and the sulfide MS is defined as $xLi_2S$-(100-x) MS, x preferably satisfies the relationship $50 \leq x \leq 95$, more preferably the relationship $60 \leq x \leq 85$. An $Li_2S$—$P_2S_5$ compound means a sulfide solid electrolyte material that uses $Li_2S$ and $P_2S_5$. The same applies to the other compounds. For example, an amorphous $Li_2S$—$P_2S_5$ compound can be obtained by performing mechanical milling or melt quenching on $Li_2S$ and $P_2S_5$.

The solid electrolyte material in the first embodiment may be either amorphous or crystalline. A crystalline solid electrolyte material can be obtained by calcining an amorphous solid electrolyte material, for example. The solid electrolyte material is preferably in the form of particles. In addition, the solid electrolyte material has an average particle size in a range of 1 nm to 100 µm, for example, preferably in a range of 10 nm to 30 µm.

A liquid electrolyte layer is usually a layer that is usually composed of a non-aqueous electrolyte solution. While the type of the non-aqueous electrolyte solution depends on the type of the battery, non-aqueous electrolyte solutions for lithium batteries usually contain a lithium salt and a non-aqueous solvent, for example. Examples of the lithium salt include inorganic lithium salts such as $LiPF_6$, $LiBF_4$, $LiClO_4$ and $LiAsF_6$; and organic lithium salts such as $LiCF_3SO_3$, $LiN(CF_3SO_2)_2$, $LiN(C_2F_5SO_2)_2$ and $LiC(CF_3SO_2)_3$. Examples of the non-aqueous solvent include ethylene carbonate (EC), propylene carbonate (PC), dimethyl carbonate (DMC), diethyl carbonate (DEC), ethylmethyl carbonate (EMC), butylene carbonate (BC), γ-butyrolactone, sulfolane, acetonitrile, 1,2-dimethoxymethane, 1,3-dimethoxypropane, diethyl ether, tetrahydrofuran, 2-methyltetrahydrofuran, and mixtures of these compounds. The concentration of the lithium salt in the non-aqueous electrolyte solution is in a range of 0.5 mol/L to 3 mol/L, for example. In the first embodiment, a low-volatile liquid, such as an ionic liquid, may be used as the non-aqueous electrolyte solution.

A gel electrolyte layer can be obtained by adding a polymer to a non-aqueous electrolyte solution to cause gelation thereof, for example. Specifically, a polymer, such as polyethylene oxide (PEO), polyacrylnitrile (PAN) or polymethylmethacrylate (PMMA), is added to a non-aqueous electrolyte solution to cause gelation thereof.

The electrolyte layer preferably has a thickness in a range of 0.1 μm to 1,000 μm, for example, preferably in a range of 0.1 μm to 300 μm, although it significantly depends on the type of the electrolyte and/or the configuration of the battery.

(4) Other Constituent Elements

The battery of the first embodiment includes at least a negative-electrode active material layer, a positive-electrode active material layer and an electrolyte layer as described above. In addition, the battery usually includes a positive electrode current collector that collects current from the positive-electrode active material layer and a negative electrode current collector that collects current from the negative-electrode active material layer. Examples of the material of the positive electrode current collector include SUS, aluminum, nickel, iron, titanium and carbon. Above all, SUS is preferred. Examples of the material of the negative electrode current collector include SUS, copper, nickel and carbon. Above all, SUS is preferred. The thickness, shape and so on of the positive electrode current collector and the negative electrode current collector are preferably selected based on the intended use and so on of the battery.

The battery of the first embodiment may have a separator between the positive-electrode active material layer and the negative-electrode active material layer. This is because a safer battery can be obtained. Examples of the material of the separator include a porous film of polyethylene, polypropylene, cellulose or polyvinylidene fluoride; and an unwoven fabric such as resin unwoven fabric and glass fiber unwoven fabric. As the battery case, a battery case for an ordinary battery may be used. Examples of the battery case include an SUS battery case.

(5) Battery

The battery of the first embodiment is not specifically limited as long as the positive-electrode active material layer or the negative-electrode active material layer contains the active material for a battery as described in "A. Active material for battery." In particular, it is preferred that, in the battery of the first embodiment, the active material for a battery is in contact with a solid electrolyte material that is represented by $Li_{1+x}Al_xGe_{2-x}(PO_4)_3$ ($0 \leq x \leq 2$) (LAGP) and the positive-electrode active material layer or the negative-electrode active material layer which contains the active material for a battery is constituted of a sintered body. This is because the formation of a different phase at the interface between the active material for a battery and the LAGP during calcination can be prevented. As a result, the active material for a battery preserves its properties even after sintering. In addition, an active material layer which is constituted of a dense sintered body has the advantage of having high energy density. Moreover, because LAGP has higher Li ion conductivity when crystallized by calcination at a temperature of 600° C. or higher, a battery with good output characteristics can be achieved.

There are the following two forms in which the active material for a battery is in contact with a solid electrolyte material that is represented by $Li_{1+x}Al_xGe_{2-x}(PO_4)_3$ ($0 \leq x \leq 2$), for example. A first form is a form in which the active material for a battery and LAGP are in contact with each other in the active material layer. In this case, the active material layer is constituted of a sintered body that contains the active material for a battery and LAGP. A second form is a form in which the active material for a battery that is contained in the active material layer is in contact with LAGP that is contained in the solid electrolyte layer. In this case, a sintered body in which the active material layer and the solid electrolyte layer are integrated is preferred.

Figure 3A:
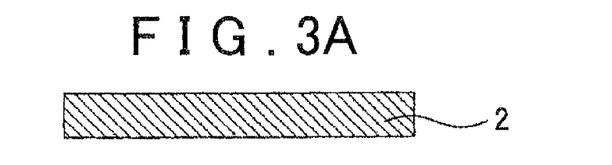
FIG. 3 is a schematic cross-sectional view that illustrates a battery according to an embodiment of the present invention.
Figure 3B:
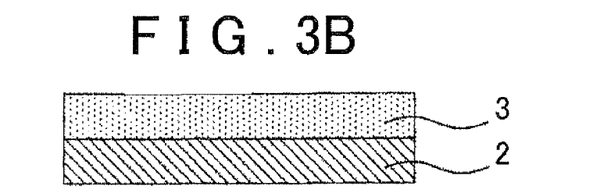
Figure 3C:
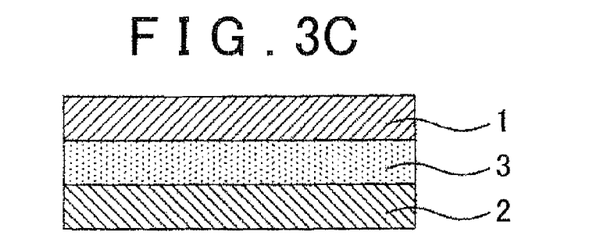

The battery of the first embodiment may have a sintered body which includes only the active material layer that contains the active material for a battery (the negative-electrode active material layer 2, for example) as shown in FIG. 3(a), a sintered body in which the active material layer that contains the active material for a battery (the negative-electrode active material layer 2, for example) and the solid electrolyte layer 3 are integrated as shown in FIG. 3(b), or a sintered body in which the active material layer that contains the active material for a battery (the negative-electrode active material layer 2, for example), the solid electrolyte layer 3, and the active material layer that does not contain the active material for a battery (the positive-electrode active material layer 1, for example) are integrated as shown in FIG. 3(c).

Especially, in the first embodiment, it is preferred that the positive-electrode active material layer is an olivine-type positive-electrode active material and that all of the positive-electrode active material layer, the solid electrolyte layer and the negative-electrode active material layer contain a solid electrolyte material that is represented by $Li_{1+x}Al_xGe_{2-x}(PO_4)_3$ ($0 \leq x \leq 2$), and all of the positive-electrode active material layer, the solid electrolyte layer and the negative-electrode active material layer are integrated in a sintered body. This is because the formation of a different phase at the interface between the active material for a battery (negative-electrode active material) and the LAGP and at the interface between the positive-electrode active material and the LAGP during calcination can be prevented. In addition, when all of the positive-electrode active material layer, the solid electrolyte layer and the negative-electrode active material layer contain LAGP, a sintered body with low interface resistance can be achieved.

The battery of the first embodiment is not specifically limited as long as it includes a positive-electrode active material layer, a negative-electrode active material layer and an electrolyte layer as described above. Examples of the type of the battery of the first embodiment include lithium battery, sodium battery, magnesium battery and calcium battery. Above all, lithium battery and sodium battery are preferred, and lithium battery is especially preferred. The battery of the first embodiment may be a battery in which the electrolyte layer is a solid electrolyte layer, or a battery in which the electrolyte layer is a liquid electrolyte layer. When the battery of the first embodiment is a battery that has a solid electrolyte layer, the battery may be a sintered body battery, powder-compact battery or thin-film battery. In addition, the battery of the first embodiment may be a primary battery or a secondary battery. In particular, the battery of the first embodiment is preferably a secondary battery. This is because the battery of the first embodiment is useful as a battery that is equipped in a vehicle because it can be repeatedly charged and discharged. Examples of the shape of the battery of the first embodiment include coin, laminate, cylinder and box. The method for the production of the battery is not specifically limited and the battery is may be produced by any conventional method for the production of a battery.

2. Second Embodiment

A battery of a second embodiment is a battery which has a positive-electrode active material layer that contains a positive-electrode active material, a negative-electrode active material layer that contains a negative-electrode active material, and an electrolyte layer that is formed between the positive-electrode active material layer and the negative-electrode active material layer, and in which the positive-electrode active material layer or the negative-electrode active material layer contains an active material that has a $Y_2Ti_2O_5S_2$ crystalline phase, the active material is in contact with a solid electrolyte material that is represented by $Li_{1+x}Al_xGe_{2-x}(PO_4)_3$ ($0 \leq x \leq 2$), and the positive-electrode active material layer or the negative-electrode active material layer which contains the active material is constituted of a sintered body.

According to the second embodiment, the use of the active material for a battery, which has high thermal stability, assures that the battery is a safe and secure battery. Especially, when the negative-electrode active material layer contains the active material for a battery, a battery with a high battery voltage can be achieved. In the second embodiment, the formation of a different phase at the interface between the active material for a battery and the LAGP during calcination can be prevented. This provides the advantage that the active material for a battery preserves its properties even after sintering. In addition, an active material layer which is constituted of a dense sintered body has the advantage of having high energy density. Moreover, because LAGP has higher Li ion conductivity when crystallized by calcination at a temperature of 600° C. or higher, a battery with good output characteristics can be achieved.

In the battery of the second embodiment, the positive-electrode active material layer or the negative-electrode active material layer contains an active material that has a $Y_2Ti_2O_5S_2$ crystalline phase. The active material preferably has a high content of the $Y_2Ti_2O_5S_2$ crystalline phase. Specifically, the active material is preferably composed primarily of the $Y_2Ti_2O_5S_2$ crystalline phase. This is because the active material for a battery has a lower potential. The expression "being composed primarily of the $Y_2Ti_2O_5S_2$ crystalline phase" that is used herein means that the $Y_2Ti_2O_5S_2$ crystalline phase constitutes the highest proportion of the active material for a battery among the crystalline phases that are contained in the active material for a battery. The proportion of the $Y_2Ti_2O_5S_2$ crystalline phase that is contained in the active material for a battery is preferably 50 mol % or higher, more preferably 60 mol % or higher, much more preferably 70 mol % or higher. The active material for a battery may be composed of a substantially single $Ti_2O_5S_2$ crystalline phase. The proportion of the $Y_2Ti_2O_5S_2$ crystalline phase that is contained in the active material for a battery can be determined by preparing a battery in which metal Li is used as a counter electrode and measuring the capacity of the battery, for example. The capacity at 0.5 V to 1.5 V, as measured with respect to metal Li, corresponds to the reaction in which Li is intercalated into and deintercalated from $Y_2Ti_2O_5S_2$.

The active material for a battery in the second embodiment preferably has an Li intercalation-deintercalation potential, as measured with respect to metal Li, of 1.5 V or lower, more preferably 1.4 V or lower, much more preferably 1.3 V or lower, especially preferably 1.2 V or lower. This is because when the active material for a battery is used as a negative-electrode active material of a lithium battery, a battery voltage comparable to or higher than that which can be achieved when conventional LTO (Li intercalation-deintercalation potential: 1.5 V) is used as a negative-electrode active material can be achieved. The active material for a battery preferably has an Li intercalation-deintercalation potential, as measured with respect to metal Li, of 0.5 V or higher. In the second embodiment, the Li intercalation-deintercalation potential of the active material for a battery can be defined as the average of its Li intercalation potential and Li deintercalation potential. The Li intercalation potential and Li deintercalation potential can be determined by a cyclic voltammetric (CV) method.

The key characteristics of the battery of the second embodiment are that the active material is in contact with a solid electrolyte material that is represented by $Li_{1+x}Al_x Ge_{2-x}(PO_4)_3$ ($0 \leq x \leq 2$) and that the positive-electrode active material layer or negative-electrode active material layer which contains the active material is constituted of a sintered body. The characteristics and other features are the same as those that are described in "1. First embodiment," and therefore their description is omitted here.

It should be noted that the present invention is not limited to the above embodiments. The above embodiments are only for illustrative purpose, and any equivalent that has substantially the same constitution and produces the same effects as technical ideas that are described in the claims of the present invention is included in the technical scope of the present invention.

The following examples describe the present invention in further detail.

Example 1

(Synthesis of Titanium Sulfide)

In an Ar glove box, titanium (manufactured by RARE METALLIC Co., Ltd.) and sulfur (manufactured by RARE METALLIC Co., Ltd.) were mixed at a molar ratio of 1:2 in a mortar. The obtained mixture was filled in a pellet mold and pressed under a load of 1,000 kg to prepare a pellet. The obtained pellet was vacuum-encapsulated in a quartz tube (degree of vacuum: $10^{-5}$ Pa). The pellet was then heated from room temperature to 600° C. over 36 hours, and was calcined at 600° C. for 96 hours. As a result, titanium sulfide ($TiS_2$) was obtained.

(Synthesis of Active Material)

As ingredients, the titanium sulfide ($TiS_2$), which was obtained by the above method, titanium oxide ($TiO_2$, manufactured by Wako Pure Chemical Industries, Ltd.), yttrium oxide ($Y_2O_3$, manufactured by Wako Pure Chemical Industries, Ltd.) were prepared. Then, the $TiS_2$, $TiO_2$ and $Y_2O_3$ were mixed at a molar ratio of 1.10:0.90:1.00 in a mortar. The obtained mixture was filled in a pellet mold and pressed under a load of 1,000 kg to prepare a pellet. The obtained pellet was vacuum-encapsulated in a quartz tube (degree of vacuum: $10^{-5}$ Pa). The pellet was then heated from room temperature to 1,100° C. over 24 hours, and was calcined at 1,100° C. for 96 hours. As a result, an active material was obtained.

Example 2

An active material was obtained in the same manner as in Example 1 except that $TiS_2$, $TiO_2$ and $Y_2O_3$ were mixed at a molar ratio of 1.05:0.95:1.00.

Comparative Example 1

An active material was obtained in the same manner as in Example 1 except that $TiS_2$, $TiO_2$ and $Y_2O_3$ were mixed at a molar ratio of 1.00:1.00:1.00.

Comparative Example 2

An active material was obtained in the same manner as in Example 1 except that $TiS_2$, $TiO_2$ and $Y_2O_3$ were mixed at a molar ratio of 1.15:0.85:1.00.

Comparative Example 3

An active material was obtained in the same manner as in Example 1 except that $TiS_2$, $TiO_2$ and $Y_2O_3$ were mixed at a molar ratio of 1.20:0.80:1.00.

Evaluation 1

(1) (X-ray Diffraction Measurement)

Figure 4:
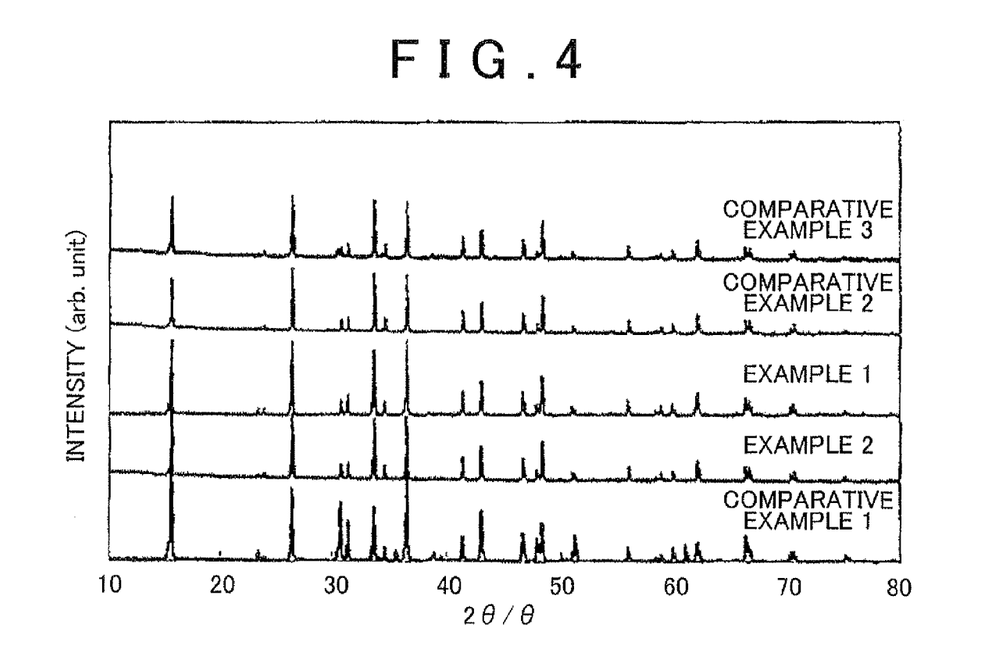
FIG. 4 shows results of X-ray diffraction measurement on active materials that were obtained in Examples 1 and 2 and Comparative Examples 1 to 3.

Each of the active materials that were obtained in Examples 1 and 2 and Comparative Examples 1 to 3 was pulverized to obtain a powdery active material. The powdery active material was subjected to X-ray diffraction (XRD) measurement. The XRD measurement was conducted with an XRD apparatus (manufactured by Rigaku Corporation) under the following conditions; measurement range of 10° to 80°, measurement interval of 0.02°, and scanning speed of 10°/min. The results are shown in FIG. 4. As shown in FIG. 4, the active materials of Examples 1 and 2 and Comparative Examples 1 to 3 were all confirmed to have a $Y_2Ti_2O_5S_2$ crystalline phase. The peaks which indicate the presence of a $Y_2Ti_2O_5S_2$ crystalline phase appeared at 2θ=15.6°, 23.4°, 23.9°, 26.2°, 30.8°, 31.3°, 33.6°, 34.5°, 36.4°, 41.3°, 43.0°, 46.6°, 47.8° and 48.2°.

Figure 5:
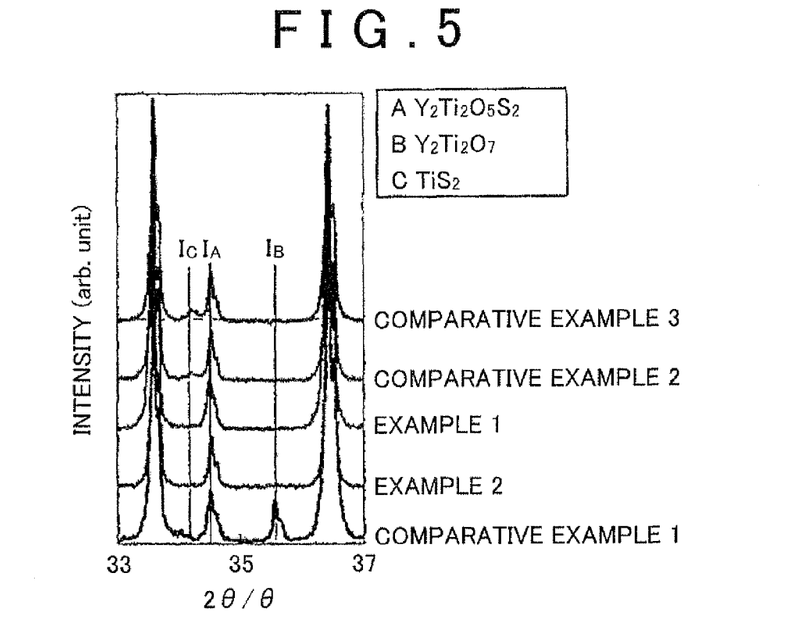
FIG. 5 is an enlarged view of FIG. 4.

FIG. 5 is an enlarged view of FIG. 4. A peak of a $Y_2Ti_2O_7$ crystalline phase appeared at 2θ=35.6° in Comparative Example 1, and a peak of $TiS_2$, which derived from excess sulfur, appeared at 2κ=34.1° in Comparative Examples 2 and 3. In contrast, peaks of a $Y_2Ti_2O_7$ crystalline phase and $TiS_2$ were not observed in Example 1. When the peak intensity of $Y_2Ti_2O_5S_2$ at 2θ=34.5°, the peak intensity of $Y_2Ti_2O_7$ at 2θ=35.6°, and the peak intensity of $TiS_2$ at 2θ=34.1° are defined as $I_A$, $I_B$ and $I_C$, respectively, as shown in FIG. 5, the $I_B/I_A$ and $I_C/I_A$ values were as shown in Table 1.

TABLE 1

| | Composition ratio (mol) | | | | |
| --- | --- | --- | --- | --- | --- |
| | $TiS_2$ | $TiO_2$ | $Y_2O_3$ | $I_B/I_A$ | $I_C/I_A$ |
| Comparative Example 3 | 1.20 | 0.80 | 1.00 | 0.05 | 0.25 |
| Comparative Example 2 | 1.15 | 0.85 | 1.00 | 0.04 | 0.16 |
| Example 1 | 1.10 | 0.90 | 1.00 | 0.04 | 0.12 |
| Example 2 | 1.05 | 0.95 | 1.00 | 0.09 | 0.07 |
| Comparative Example 1 | 1.00 | 1.00 | 1.00 | 0.85 | 0.20 |

The active materials that were obtained in Examples 1 and 2, which did not have peaks of a $Y_2Ti_2O_7$ crystalline phase and $TiS_2$ as impurities as shown in Table, were confirmed to be an active material that was composed of a single $Y_2Ti_2O_5S_2$ crystalline phase. It is presumed that the $I_C/I_A$ value in Comparative Example 1 was large because the peak of $TiS_2$ appeared at the shoulder of an adjacent peak of $Y_2Ti_2O_5S_2$.

(2) Charge-Discharge Properties

Batteries for evaluation were produced using the active materials that were obtained in Example 1 and Comparative Example 1, and the charge-discharge properties of the batteries were evaluated. The active material (pellet) that was obtained in Example 1 or Comparative Example 1 was used as a positive-electrode active material, and metal Li was used as a negative-electrode active material. As an electrolytic solution, a solution of $LiPF_6$ at a concentration of 1 mol/L in a solvent that was obtained by mixing the same volume of EC (ethylene carbonate), dimethyl carbonate (DMC) and EMC (ethylmethyl carbonate) was used. These constituent elements were placed in a CR2032 coin type battery case to obtain a battery for evaluation.

Figure 6:
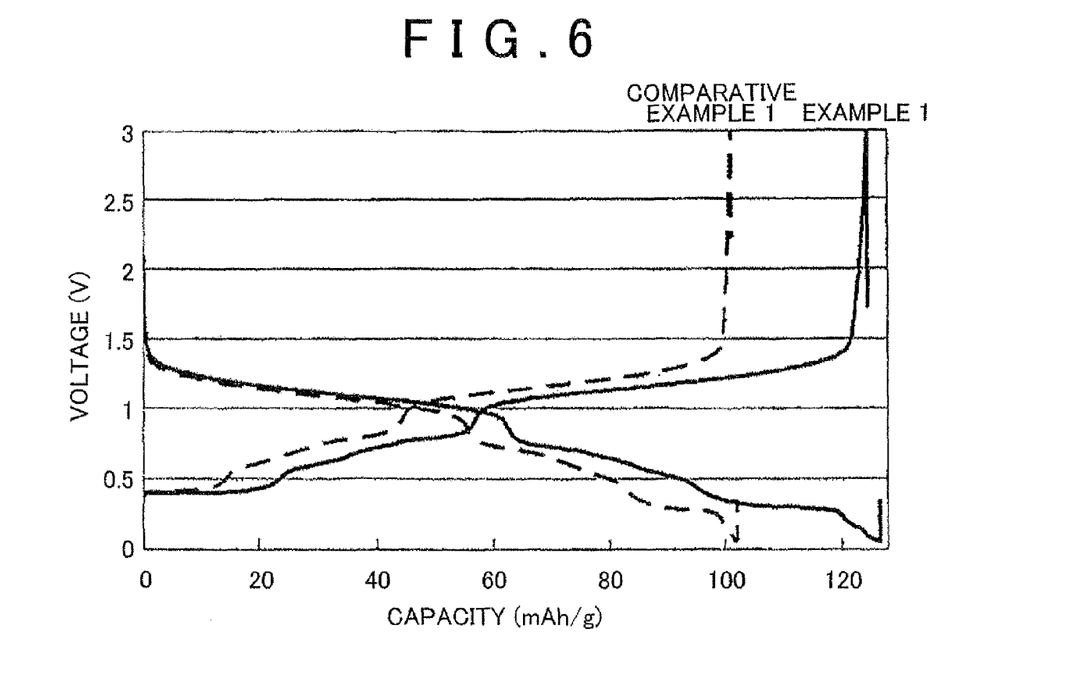
FIG. 6 shows the results of evaluation of charge-discharge properties of batteries for evaluation that used the active materials that were obtained in Example 1 and Comparative Example 1.

The obtained battery for evaluation was placed in a 25° C. constant temperature bath, and charged and discharged at a constant charge-discharge current (0.2 mA) in a charge-discharge range of 0.05 V to 3.0 V. The results are shown in FIG. 6. As shown in FIG. 6, the battery for evaluation of Example 1 showed an increase in discharge capacity and charge capacity compared to the battery for evaluation of Comparative Example 1. Specifically, the discharge capacity increased from 102 mAh/g to 126 mAh/g, and the charge capacity increased from 101 mAh/g to 124 mAh/g.

Example 3

A sintered-type battery in which the active material that was obtained in Example 1 was used as a negative-electrode active material was fabricated. First, the active material that was obtained in Example 1 (powder, YTOS) and an LAGP glass (manufactured by Hosokawa Micron Corporation) as an oxide solid electrolyte material were mixed at a volume ratio of 1:1 to prepare a negative electrode composite material. Lithium iron phosphate ($LiFePO_4$, LFP) and the LAGP glass were mixed at a volume ratio of 1:1 to prepare a positive electrode composite material. The LAGP glass and an LAGP crystal (manufactured by Kojundo Chemical Lab. Co., Ltd) were mixed at a weight ratio of 1:1 to prepare a composite material for a solid electrolyte layer.

Next, 0.2 g of the composite material for a solid electrolyte layer was pressed under 5 kN to form it into a pellet. The positive electrode composite material was applied to one of the faces of the pellet and the negative electrode composite material was applied to the other face of the pellet. In this state, the pellet was pressed under 30 kN to form a pellet-shaped power generation element. The obtained pellet was subjected to calcination (preliminary calcination) at 540° C. for 2 hours in an Ar atmosphere and then calcination (final calcination) at 600° C. for 2 hours in an Ar atmosphere. As a result, a sintered body of the power generation element was obtained. Current collecting portions were formed on both sides of the obtained sintered body by gold evaporation, whereby a sintered-type battery was obtained.

Evaluation 2

(1) Evaluation of Electrochemical Properties

Figure 7:
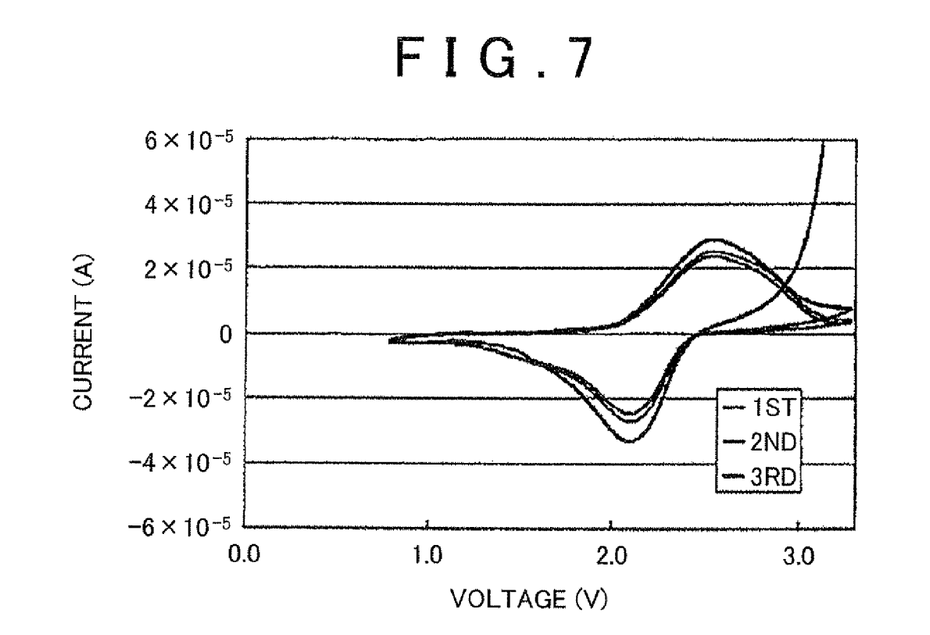
FIG. 7 shows the result of CV measurement on a sintered-type battery that was obtained in Example 3.

The sintered-type battery that was obtained in Example 3 was subjected to cyclic voltammetric (CV) measurement. The CV measurement was conducted in a 25° C. constant temperature bath with an electrochemical measurement system (147055BEC, manufactured by Solartron Metrology) at a potential range of 0.8 V to 3.3 V (vs $Li/Li^+$) and a sweep rate of 0.1 mV/s. The result is shown in FIG. 7. The sintered-type battery that was obtained in Example 3 was placed in a 25° C. constant temperature bath and charged and discharged at a constant charge-discharge current (0.2 μA) in a charge-discharge range of 0 V to 3.0 V. The result is shown in FIG. 8.

Figure 8:
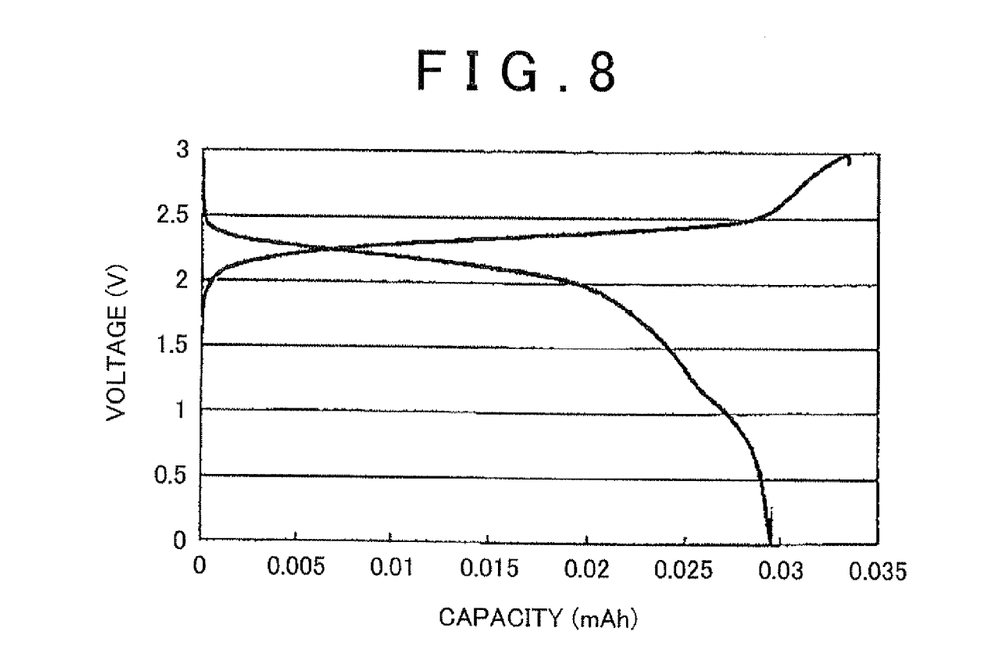
FIG. 8 shows the result of evaluation of charge-discharge properties of a sintered-type battery that was obtained in Example 3.

As shown in FIG. 7 and FIG. 8, the sintered-type battery that was obtained in Example 3 exhibited a normal battery reaction. In addition, the sintered-type battery had an electromotive force of about 2.2 V and was confirmed to be a battery which had a property that is originated from the active materials (LFP: 3.4 V, YTOS: 1.2 V).

(2) Reactivity Between Active Materials and Solid Electrolyte Material

The reactivity between the active materials (YTOS, LFP) that were used in Example 3 and the solid electrolyte material (LAGP) was evaluated. First, the positive electrode composite material and negative electrode composite material that were produced in Example 3 were prepared. Then, 0.2 g of each of the composite materials was pressed under 30 kN to form it into a pellet. The obtained pellets were subjected to calcination (preliminary calcination) at 540° C. for 2 hours in an Ar atmosphere and then calcination (final calcination) at 600° C. for 2 hours in an Ar atmosphere. Each of the obtained sintered bodies was pulverized in a mortar, and the resulting powders were subjected to XRD measurement. The results are shown in FIG. 9 and FIG. 10.

Figure 9:
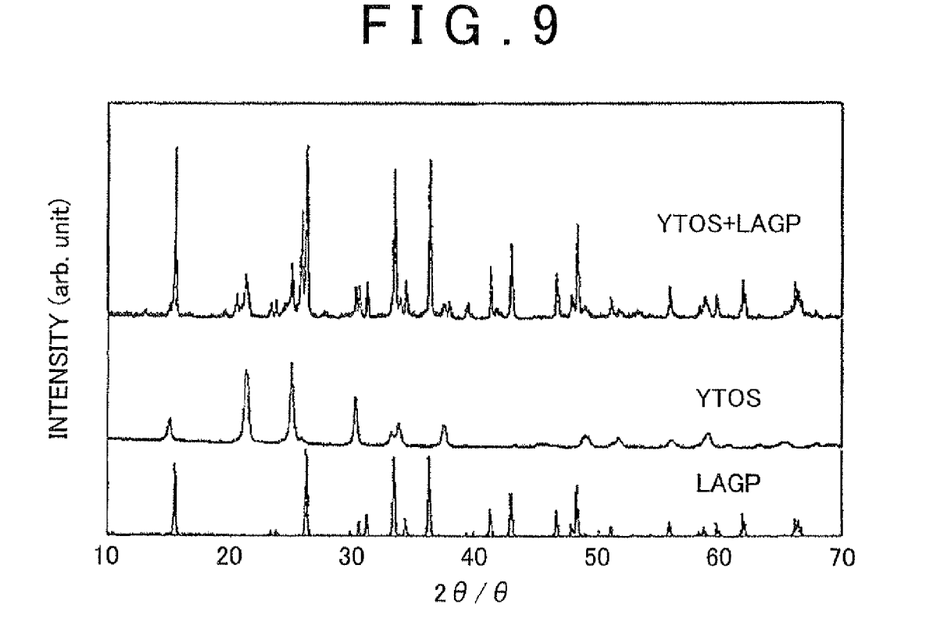
FIG. 9 shows the result of evaluation of reactivity of a negative electrode composite material that was prepared in Example 3.
Figure 10:
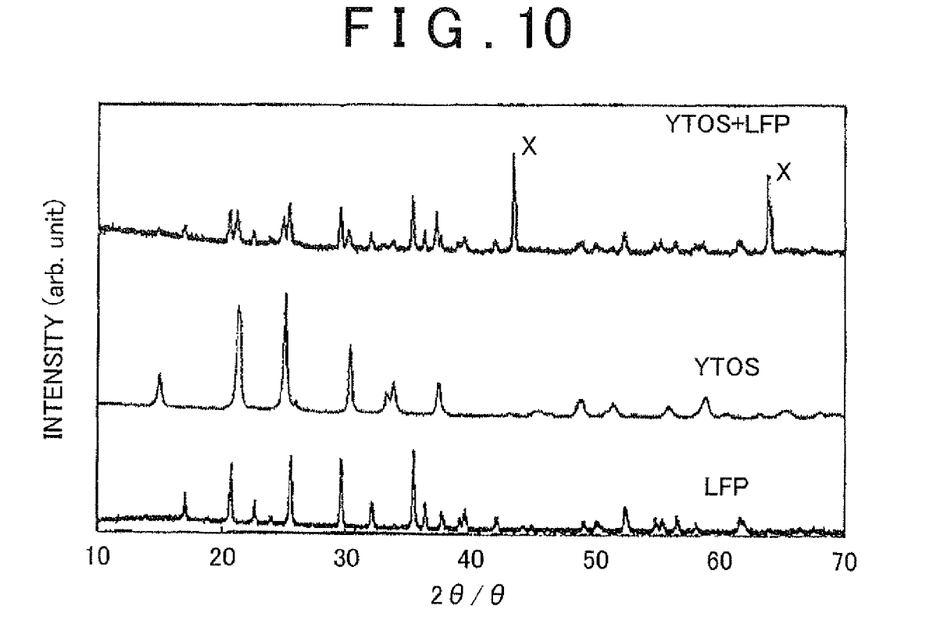
FIG. 10 shows the result of evaluation of reactivity of a positive electrode composite material that was prepared in Example 3.

As shown in FIG. 9 and FIG. 10, no different phase was observed in the active materials (YTOS, LFP) and the solid electrolyte material (LAGP) that were produced in Example 3 even after calcination. This suggests that the active materials and the solid electrolyte material did not react with each other and had the same structure as that before the calcination even after calcined at a high temperature. The peaks that are indicated by X in FIG. 10 are peaks of aluminum that is contained in the sample holder and do not indicate the formation of a different phase.

What is claimed is:

1. An active material for a battery, comprising:
a $Y_2Ti_2O_5S_2$ crystalline phase,
wherein the active material has an $I_B/I_A$ value of 0.3 or smaller and an $I_C/I_A$ value of 0.15 or smaller, wherein $I_A$, $I_B$ and $I_C$ are the peak intensity of the $Y_2Ti_2O_5S_2$ crystalline phase at $2\theta=34.5°$, the peak intensity of a $Y_2Ti_2O_7$ crystalline phase at $2\theta=35.6°$, and the peak intensity of $TiS_2$ at $2\theta=34.1°$, respectively, that are measured by X-ray diffraction using CuKα radiation.

2. The active material according to claim 1, wherein the $I_C/I_A$ value is 0.12 or smaller.

3. A battery, comprising:
a positive-electrode active material layer that contains a positive-electrode active material,
a negative-electrode active material layer that contains a negative-electrode active material, and
an electrolyte layer that is formed between the positive-electrode active material layer and the negative-electrode active material layer,
wherein the positive-electrode active material layer or the negative-electrode active material layer contains the active material according to claim 1.

4. The battery according to claim 3, wherein the negative-electrode active material layer contains the active material.

5. The battery according to claim 3, wherein the active material is in contact with a solid electrolyte material that is represented by $Li_{1+x}Al_xGe_{2-x}(PO_4)_3$, wherein x is equal to or greater than 0, and equal to or less than 2, and
wherein the positive-electrode active material layer or the negative-electrode active material layer which contains the active material is constituted of a sintered body.

6. The battery according to claim 4, wherein the positive-electrode active material layer includes an olivine-type positive-electrode active material,
wherein the positive-electrode active material layer, the electrolyte layer and the negative-electrode active material layer contain a solid electrolyte material represented by $Li_{1+x}Al_xGe_{2-x}(PO_4)_3$, wherein x is equal to or greater than 0, and equal to or less than 2, and
wherein the positive-electrode active material layer, the electrolyte layer and the negative-electrode active material layer are integrated in a sintered body.

* * * * *